(12) United States Patent
Logothetis

(10) Patent No.: US 9,086,059 B2
(45) Date of Patent: Jul. 21, 2015

(54) METHOD AND APPARATUS FOR ELECTRICITY PRODUCTION BY MEANS OF SOLAR THERMAL TRANSFORMATION

(76) Inventor: Georgios Logothetis, Loßburg (DE)

( * ) Notice: Subject to any disclaimer, the term of this patent is extended or adjusted under 35 U.S.C. 154(b) by 160 days.

(21) Appl. No.: 13/542,814

(22) Filed: Jul. 6, 2012

(65) Prior Publication Data
US 2013/0255256 A1    Oct. 3, 2013

Related U.S. Application Data

(60) Provisional application No. 61/619,041, filed on Apr. 2, 2012.

(51) Int. Cl.
*F03G 6/06* (2006.01)
*F24J 2/38* (2014.01)
(Continued)

(52) U.S. Cl.
CPC ............... *F03G 6/068* (2013.01); *F24J 2/067* (2013.01); *F24J 2/07* (2013.01); *F24J 2/085* (2013.01); *F24J 2/34* (2013.01); *F24J 2/38* (2013.01); *F24J 2/542* (2013.01); *F24J 2/461* (2013.01); *F24J 2002/0084* (2013.01); *F24J 2002/075* (2013.01); *F28D 20/0056* (2013.01);
(Continued)

(58) Field of Classification Search
CPC ............. F03G 6/068; F24J 2/067; F24J 2/34; F24J 2002/075; F24J 2002/385; Y02E 10/40; Y02E 10/43; Y02E 10/46; Y02E 10/47
USPC ............... 60/641.8–641.15; 126/569–574, 126/600–608, 617–620, 683, 698–700, 714
See application file for complete search history.

(56) References Cited

U.S. PATENT DOCUMENTS 4,203,426 A * 5/1980 Matlock et al. ............... 126/605
4,335,578 A    6/1982 Osborn et al.
(Continued)

FOREIGN PATENT DOCUMENTS

| JP | S60 66052 A | 4/1985 |
|---|---|---|
| WO | 02097341 A1 | 12/2002 |

(Continued)

OTHER PUBLICATIONS

Georgios Logothetis, Specification, Modelling, Verification and Runtime Analysis of Real Time Systems, Dissertation Thesis, Jul. 17, 2003, Karlsruhe, DE.

*Primary Examiner* — Thomas Denion
*Assistant Examiner* — Laert Dounis
(74) *Attorney, Agent, or Firm* — Hulsey Hunt, P.C.

(57) ABSTRACT

We present an improved system for solar energy collection and electricity generation, comprising a solar collector apparatus, said apparatus comprising an array of square Fresnel lenses arranged in rows with modular energy absorption devices located below, wherein the array is mounted on arms at a low height above ground, the rows of said array are rotatable horizontally about their lengthwise axis, and the array is mounted on a rotatable base The system further comprises transportable insulated storage tanks containing a storage medium, Stirling engines and generators. The solar collection apparatus heats the storage medium, the storage medium supplies the Stirling engines with heat, and each engine is coupled to a generator.

In a preferred embodiment, the system additionally comprises embedded controllers using real-time algorithms providing smart on-the-fly management of the system.

18 Claims, 11 Drawing Sheets

(51) Int. Cl.
  *F24J 2/34* (2006.01)
  *F24J 2/06* (2006.01)
  *F24J 2/08* (2006.01)
  *F24J 2/07* (2006.01)
  *F24J 2/54* (2006.01)
  *F24J 2/46* (2006.01)
  *F28D 20/00* (2006.01)
  *F24J 2/00* (2014.01)

(52) U.S. Cl.
  CPC ......... *F28D2020/0047* (2013.01); *Y02E 10/41* (2013.01); *Y02E 10/43* (2013.01); *Y02E 10/46* (2013.01); *Y02E 10/47* (2013.01)

(56) References Cited

U.S. PATENT DOCUMENTS

| | | | |
|---|---|---|---|
| 4,401,103 A | 8/1983 | Thompson | |
| 4,411,490 A * | 10/1983 | Daniel | 126/648 |
| 4,440,150 A * | 4/1984 | Kaehler | 126/602 |
| 4,511,755 A * | 4/1985 | Mori | 136/246 |
| 6,498,290 B1 * | 12/2002 | Lawheed | 136/246 |
| 6,775,982 B1 * | 8/2004 | Kitamura et al. | 60/641.8 |
| 7,055,519 B2 * | 6/2006 | Litwin | 126/683 |
| 8,215,437 B2 * | 7/2012 | Watson et al. | 180/165 |
| 8,378,280 B2 * | 2/2013 | Mills et al. | 250/203.4 |
| 2003/0000564 A1 | 1/2003 | Shingleton | |
| 2005/0011513 A1 * | 1/2005 | Johnson | 126/698 |
| 2006/0225729 A1 | 10/2006 | Litwin | |
| 2010/0101621 A1 | 4/2010 | Xu | |
| 2011/0067687 A1 * | 3/2011 | Raymond et al. | 126/600 |
| 2012/0073564 A1 * | 3/2012 | Cheng et al. | 126/573 |
| 2012/0180484 A1 * | 7/2012 | Bak | 60/641.15 |

FOREIGN PATENT DOCUMENTS

| | | |
|---|---|---|
| WO | 2007106519 A2 | 9/2007 |
| WO | 20080115305 A2 | 9/2008 |
| WO | WO 2010102619 A2 * | 9/2010 |
| WO | 2012030225 A2 | 3/2012 |

* cited by examiner

- $\neg \varphi, \varphi \wedge \psi \in$ JCTL
- $EX^\kappa \varphi \in$ JCTL
- $EG^\kappa \varphi \in$ JCTL
- $E[\varphi \underline{U}^\kappa \psi] \in$ JCTL     $\kappa \in \{ [a,b], <a, \leq a, =a, \geq a, >a \}$

METHOD AND APPARATUS FOR ELECTRICITY PRODUCTION BY MEANS OF SOLAR THERMAL TRANSFORMATION

CROSS-REFERENCE TO RELATED APPLICATIONS

This application claims U.S. Provisional Application, Ser. No. 61/619,041, filed on Apr. 2, 2012.

FIELD OF THE INVENTION

The present invention relates to the production of electrical energy from solar thermal energy. In particular, it relates to the collection and storage of solar thermal energy, and the subsequent production of electrical energy therefrom.

BACKGROUND OF THE INVENTION

Many systems related to thermally converting solar energy to more useful types of energy have been proposed. For example, International Patent Publication WO 81/03220 discloses such a complete system particularly directed to home use, including a Stirling engine coupled to a generator for electricity production. That system has, however, considerable disadvantages, i.a. the use of hot air and rocks as a heat conducting and storage medium, which is somewhat impractical and quite inefficient, as well as the use of a somewhat complex and inefficient system of solar collectors configured to be mounted on the roof of a house. Such a system would prove inefficient and impractical for the purpose of larger-scale power generation.

Typically, systems suitable for larger-scale power generation employ more advanced solar collectors using some type of parabolic reflector, as is e.g. disclosed in U.S. Pat. No. 4,335,578. However, the dish-type reflector shown in U.S. Pat. No. 4,335,578 is highly susceptible to wind influence since it is mounted high above the ground, difficult to keep clean and thus operate efficiently, and additionally expensive to produce. The high wind susceptibility means that the system cannot operate at greater wind strengths, since the collector must then be aligned horizontally to avoid damage. The heat absorption and transport method employed by this system is moreover quite complicated, using two different fluids, state changes of these fluids, heat exchangers etc., thus making the system expensive to produce and maintain. However, U.S. Pat. No. 4,335,578 features a detailed discussion of the suitability of various fluids as heat conducting and storage medium, showing that e.g. molten salt has a high potential for use as such a fluid.

More modern systems, such as that disclosed in US patent application 2006/0225729 A1, attempt to avoid the high wind susceptibility of dish-type solar collectors by the use of smaller trough-type collectors that typically have a pipe or the like at the line of focus of the trough, through which the heat conducting and storage fluid can flow. Such devices can be mounted much closer to the ground. However, they also have significant disadvantages. The troughs tend to act as dirt collectors, greatly reducing their efficiency, unless they are covered by some kind of transparent covering that also reduces their efficiency. Moreover, due to their linear layout, such systems can only track the sun around one axis, reducing their general efficiency.

Some of the disadvantages associated with the use of parabolic reflectors (whether of dish- or trough-type) as solar collectors can be overcome by the use of Fresnel lenses instead, as is e.g. disclosed in U.S. Pat. No. 6,775,982 B1. However, the power requirements of the Stirling engine disclosed therein lead to the use of very large Fresnel lenses of e.g. 20 m diameter. Such large Fresnel lenses are nevertheless quite heavy and expensive and must be mounted high above the ground due to their substantial focal length, once again resulting in a high susceptibility to wind influence.

Moreover, the power transfer from the Fresnel lenses to the Stirling engine by means of light guiding fibers, as disclosed in U.S. Pat. No. 6,775,982 B1, requires considerable further refinement, since directly heating a Stirling engine by means of light guiding fibers will destroy the engine due to the high temperatures achieved (approximately 2000° C. while typical operating temperatures of Stirling engines are 700-1000° C.).

BRIEF SUMMARY OF THE INVENTION

It is, therefore, an object of the present invention to provide an improved solar collector apparatus. This apparatus comprises an array of Fresnel lenses arranged in rows, the Fresnel lenses having a focal length, and energy absorption devices located below each of the Fresnel lenses at a distance substantially corresponding to their focal length, wherein the array is mounted on arms at a height above ground substantially corresponding to the focal length of the Fresnel lenses, wherein the rows of said array of Fresnel lenses are configured such that they are rotatable about a lengthwise horizontal axis of said rows, wherein means are provided for rotating the rows of Fresnel lenses about their lengthwise axis, and wherein the array of Fresnel lenses is rotatable about a vertical axis. Thus, the collector apparatus can be mounted low above the ground, since it comprises multiple smaller Fresnel lenses that can have relatively short focal lengths. The configuration achieved enables effective two-axis sun tracking.

In one embodiment, the Fresnel lenses are substantially square shaped, which enables them to be arranged more efficiently and lowers production costs.

In a further embodiment, each row of Fresnel lenses has an automatic wipe-cleaning system. Thus, they can be kept clean, ensuring continued operation of the solar collector apparatus at high efficiency.

In another embodiment, the array of Fresnel lenses is mounted on a base rotatable about a vertical axis, the rotatable base forming an insulated lid of a storage tank for a heat conduction and storage fluid. Thus, the distance between the heat conduction and storage fluid and the means for heating the fluid is minimised.

In a preferred embodiment, each energy absorption device comprises a heat conductor, a transparent plate mounted above the heat conductor, and an insulated casing surrounding the heat conductor where it is not covered by the transparent plate, wherein both the heat conductor and the transparent plate have the shape of a segment of a circle having a center located above the transparent plate, wherein the heat conductor extends into a heat conduction and storage fluid through an opening in the insulated casing, a part of the heat conductor submerged in the heat conduction and storage fluid being substantially gill-shaped.

In another preferred embodiment, each energy absorption device comprises a light guiding fiber (or alternatively a bundle of light guiding fibers) having an end, means for adjusting the position of the end of the light guiding fiber, and a casing surrounding the light guiding fiber and the means for adjusting the position of its end, wherein the upper side of the casing is formed by a transparent plate having the shape of a segment of a circle having a center located above the transparent plate, wherein the light guiding fiber extends to a heat conduction and storage medium through an opening in the casing. A diverging lens may be mounted adjacent to the end of the light guiding fiber to adjust the acceptance angle. Thus, modular energy absorption devices are provided, which can absorb heat from the focus of the Fresnel lenses and transfer this heat to the heat conduction and storage medium.

In further embodiments, each energy absorption device additionally comprises an automatic wipe-cleaning system for the transparent plate. Thus, they can be kept clean, ensuring continued operation of the solar collector apparatus at high efficiency.

In another embodiment, the means for rotating the rows of Fresnel lenses about their lengthwise axis are linked to the means for adjusting the position of the end of the light guiding fiber in those energy absorption devices comprising such a fiber. Thus, the solar tracking of the rows of Fresnel lenses is linked to the positioning of the light guiding fibers, ensuring that they always remain in the focal region of the corresponding Fresnel lenses.

In a second aspect, it is an object of the invention to provide an improved system for solar energy collection and electricity production. This system comprises a solar collector apparatus as provided above, a thermal storage system having a thermal energy conduction and storage medium, at least one means of transforming thermal energy into electric energy, means connecting the solar collector apparatus with the thermal storage system, means connecting the thermal storage system with the at least one means for transforming thermal energy into electrical energy, wherein the solar collection apparatus heats the thermal energy conduction and storage medium via the corresponding means, and wherein the thermal energy conduction and storage medium supplies the at least one means for transforming thermal energy into electrical energy with thermal energy via the corresponding means. Thus, a complete and efficient system for producing electrical energy from solar thermal energy is provided. The system can directly convert thermal energy to electrical energy using e.g. thermoelectric generators (based on the Seebeck effect).

In a preferred embodiment, the means for transforming thermal energy into electrical energy comprise a heat engine employing a thermodynamic cycle coupled to a means for generating electrical energy from mechanical energy.

In a particularly preferred embodiment, the heat engine is a Stirling engine.

In one embodiment, the thermal storage system has at least one insulated storage tank containing the heat conduction and storage medium, said medium being a solid.

In another embodiment, the heat conduction and storage medium is a fluid, and the thermal storage system has at least one insulated storage tank containing said fluid.

In a preferred embodiment, the heat conduction and storage solid is graphite, while in another preferred embodiment, the heat conduction and storage fluid is molten salt. Both graphite and molten salt have proven to be very effective heat conduction and storage media in the temperature range generally achieved by solar thermal systems.

In further embodiments, the system for solar energy collection and electricity production comprises means for exchanging said at least one insulated storage tank, wherein the insulated storage tank is configured to be transportable.

In a further embodiment, the means connecting the solar collector apparatus with the thermal storage system are configured such that the at least one insulated storage tank is heated from below.

In a further embodiment, the means connecting the thermal storage system with the at least one heat engine are configured such that heat is transferred from the top of the at least one insulated storage tank to the at least one heat engine. Thereby, efficient heat transfer is ensured within the insulated storage tank, using conduction in solid storage media and convection in fluid storage media.

In another embodiment, the system for solar energy collection and electricity production additionally comprises embedded controllers using real-time algorithms, said algorithms being able to consider weather forecast data. Thus, smart and automatic, on-the-fly management of the system is provided, and weather forecasts can be considered.

This aim is achieved by the inventions as claimed in the independent claims. Advantageous embodiments are described in the dependent claims.

Even if no multiple back-referenced claims are drawn, all reasonable combinations of the features in the claims shall be disclosed.

BRIEF DESCRIPTION OF THE SEVERAL VIEWS OF THE DRAWINGS

Other objects and advantages of the present invention may be ascertained from a reading of the specification and appended claims in conjunction with the drawings therein.

For a more complete understanding of the present invention, reference is established to the following description made in connection with accompanying drawings in which.

DETAILED DESCRIPTION

Technical Solutions
Ground Placement of the Heat Engine
Systems using parabolic reflectors have a focal point F, where the Stirling engine is placed, situated high above the ground, resulting in many serious disadvantages:
Susceptibility to wind forces requires the systems to interrupt their operation at high wind speeds and move into a horizontal position until wind speed decreases.

The systems can not benefit from storage of thermal energy.

Expensive heavy-duty construction is required.

A high amount of smaller, lighter Stirling engines is required, which significantly increases the overall and maintenance cost.

Further high maintenance costs (e.g. cleaning) are incurred.

In order to keep a heat engine close to the ground, the point F must be lowered, which can be achieved using optical lenses instead of parabolic reflectors.

Designing a Solar Heat Producing System Using Optical Lenses

Low weight

Some of the largest Stirling engines commercially produced deliver approximately 40 kW. The Earth receives 1.413-1.321 W/m² of solar irradiation (1 W/m² assumed for simplicity). At a typical 30% efficiency, such an engine needs approx. 133 kW of solar irradiation, requiring a lens area of 133 m², i.e. a diameter of approximately 13 m. Both the weight and the cost of such a lens would be immense.

Figure 1:
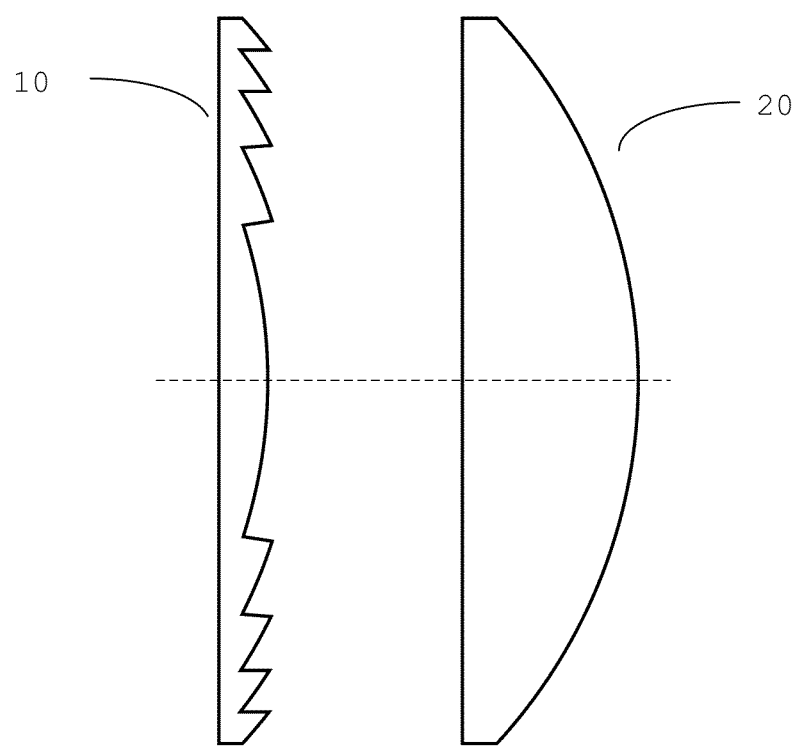
FIG. 1 compares a Fresnel lens to a conventional lens.

To overcome both problems at once, we use Fresnel lenses 10 instead of regular optical lenses 20 (FIG. 1). Fresnel lenses feature large apertures and short focal lengths without the mass and volume required by lenses of conventional design. Fresnel lenses available commercially at low cost are often made of PVC in a quadratic shape.

Placement Low Above the Ground

Covering an area of 133 m² would require a Fresnel lens with a size of approx. 11.5 m×11.5 m. Even made of PVC, such a lens would still have a significant weight and cost.

Figure 2:
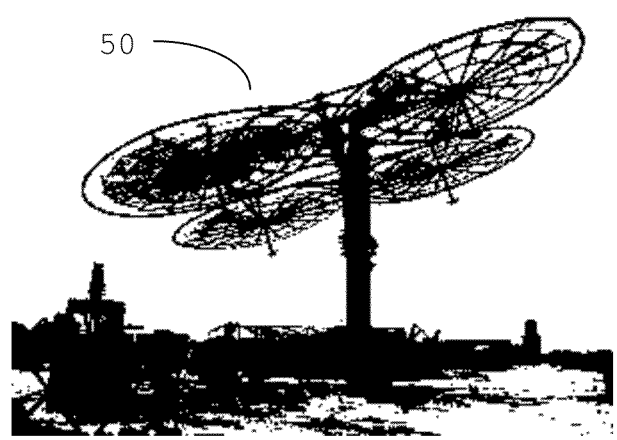
FIG. 2 shows a typical example of an industrial application.

Furthermore, the focal length $f$ of such a large lens requires an installation at a significant height above the ground. FIG. 2 shows a typical example 50 of an industrial application, which is very susceptible to wind forces.

Figure 3:
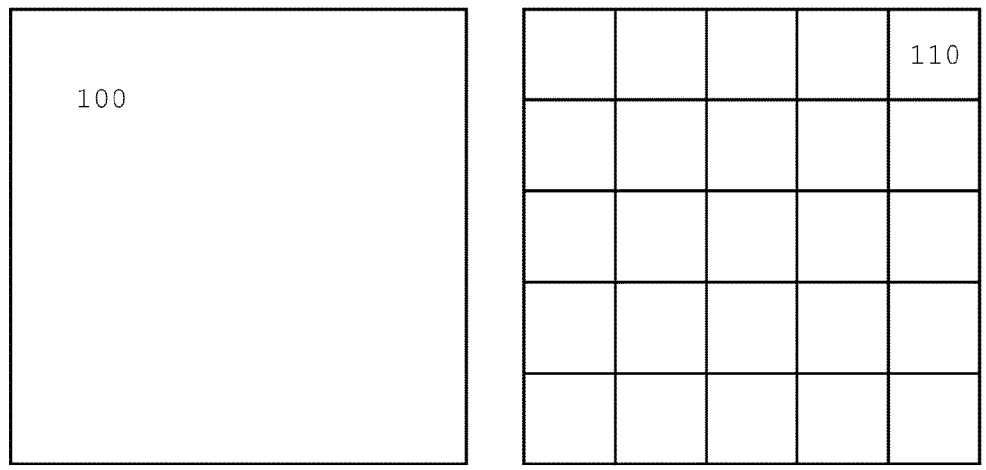
FIG. 3 illustrates how an array of Fresnel lenses replaces a single one.
Figure 4:
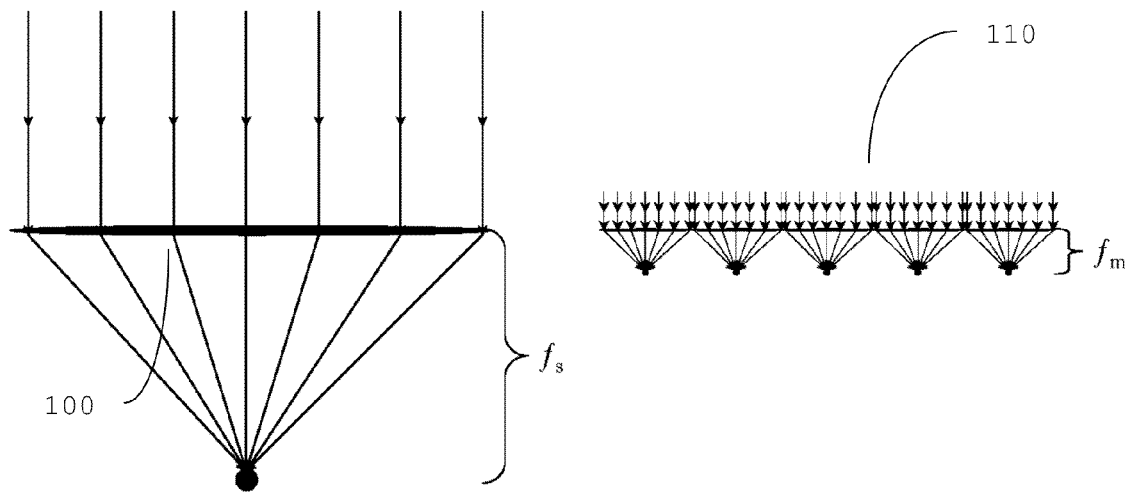
FIG. 4 shows an array of Fresnel lenses replacing a single one.

To solve this problem, we introduce a system comprising an array (or matrix) of Fresnel lenses instead of a single one, as shown in FIG. 3. The array of smaller Fresnel lenses 110 covers the same total area as the single large one 100, but the focal length $f_m$ of a smaller lens 110 in the array is significantly shorter than the focal length $f_s$ of the single lens 100, as shown in FIG. 4. Thus, the array allows us to install the solar capturing system very low above the ground.

Supplying Large Stirling Engines at Low Cost

We consider large Stirling engines in order to minimize installation and maintenance costs. As an example, we consider an area of 144 m² supplying a Stirling engine with 144 kW of heat. An engine with a typical 30% efficiency would deliver approximately 43.2 kW of power. We implement a 12 m×12 m solar capturing array (SCA), consisting of 144 single Fresnel lenses with a size of only 1 m×1 m=1 m² each. Such Fresnel lenses are widely commercially produced, meaning that the total cost of such an array can be kept very low.

Cleaning and Maintenance

Due to their shapes (dishes or troughs), most collector systems also act as collectors for dust and dirt. A dirty reflector surface significantly reduces the performance of the system, requiring frequent interruptions for cleaning and maintenance. Due to its flat surfaces, on the other hand, our system is very easy to clean. This can be performed by an automatic cleaning system, which features a wiper on each single row of lenses of the array.

Performing Two-Axis Sun-Tracking

Figure 5:
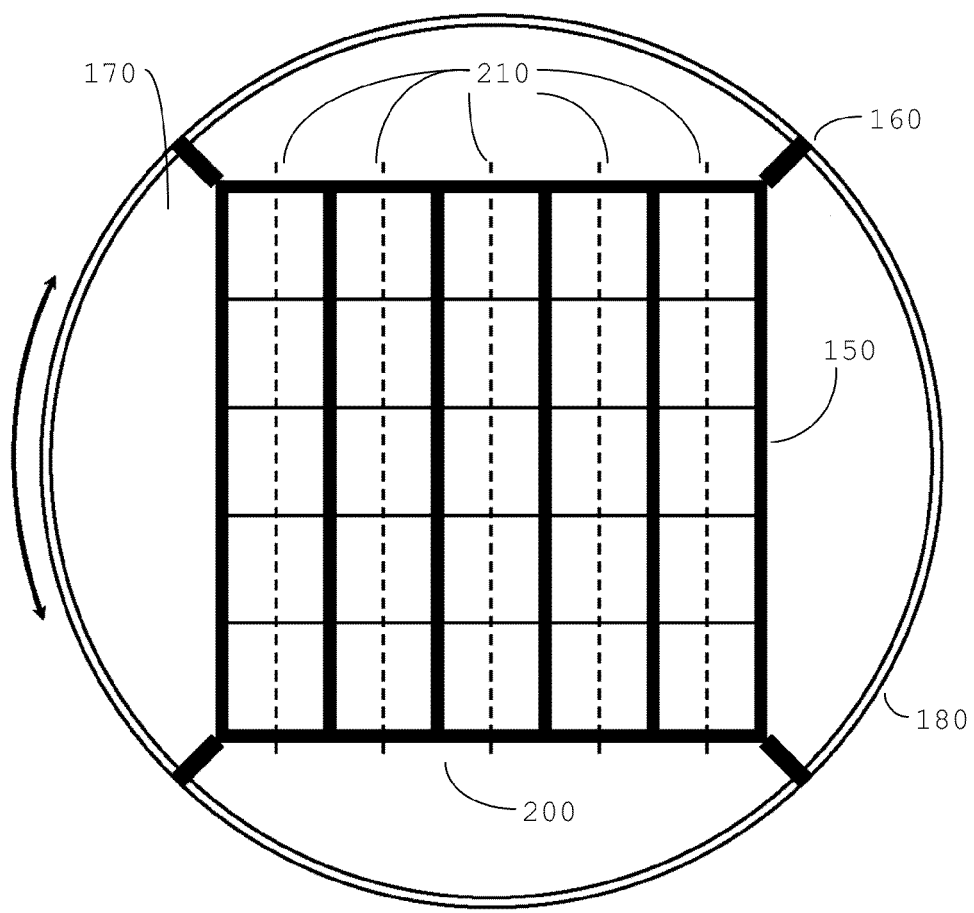
FIG. 5 shows a top view of the horizontal and vertical axis sun tracking.
Figure 6:
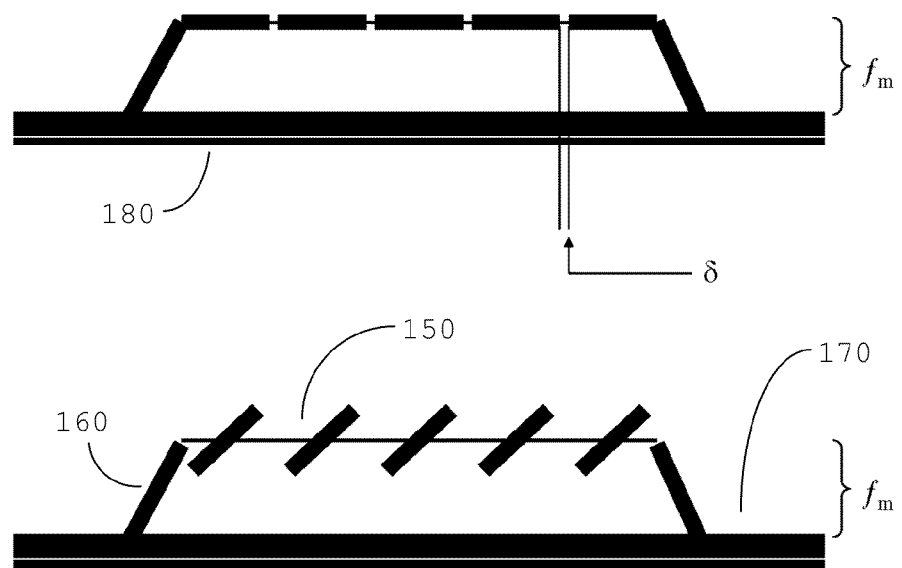
FIG. 6 shows a side view of the vertical axis sun tracking.

In order to perform sun tracking at the horizontal axis, we introduce a rotatable base 170, on which the solar capturing array (SCA) 150 is mounted. The entire system is placed on circular rails 180 allowing its rotation (see FIG. 5). Four or more arms 160 keep the SCA at a height of $f_m$ above the level of the rails (FIG. 6).

In order to perform sun tracking at the vertical axis, we divide the SCA into rows of lenses, separating all rows from each other and putting them into their own separate frames. Each frame features a central longitudinal axis 210 and is mounted separately on a main external frame 200, which is installed on arms 160, as shown in FIG. 5. A vertical movement is then allowed for each row by means of its central axis 210, as shown in FIG. 6.

Minimizing the Area Required to Avoid Shading

In our approach the area required to keep the solar collectors from shading each other is minimized. The solar capturing array rotates entire rows of Fresnel lenses in the x-axis (horizontal). Hence, it allows the absence of any distance between the single Fresnel lenses of each row.

As shown in FIG. 6, only a distance δ between the rows is required and must be chosen correctly, in order to allow the shadow-free operation of the system, as the rows perform their vertical movement (in the y-axis).

Capturing of Focused Solar Energy

In order to prevent energy loss, the rotatable base must have very good thermal insulation. The solar energy delivered by the SCA can be captured in two different ways.

a. Capturing of Focused Solar Energy by Means of Heat Conductors

Figure 7:
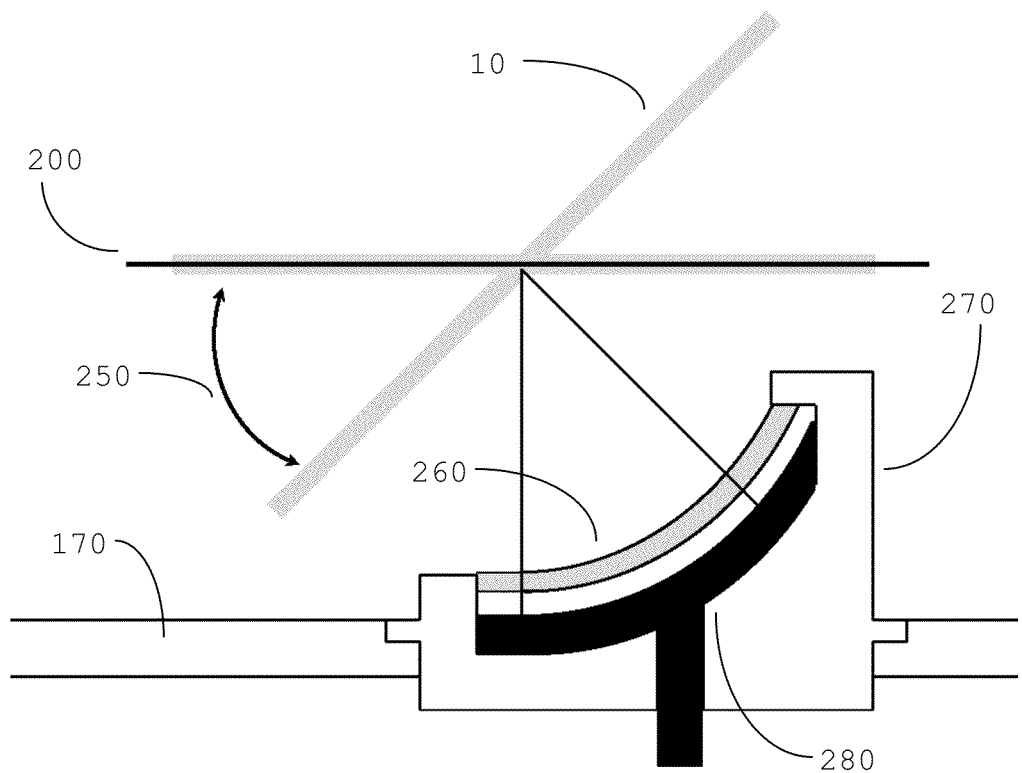
FIG. 7 shows a side view of an insulated capturing socket with embedded heat conductor.
Figure 8:
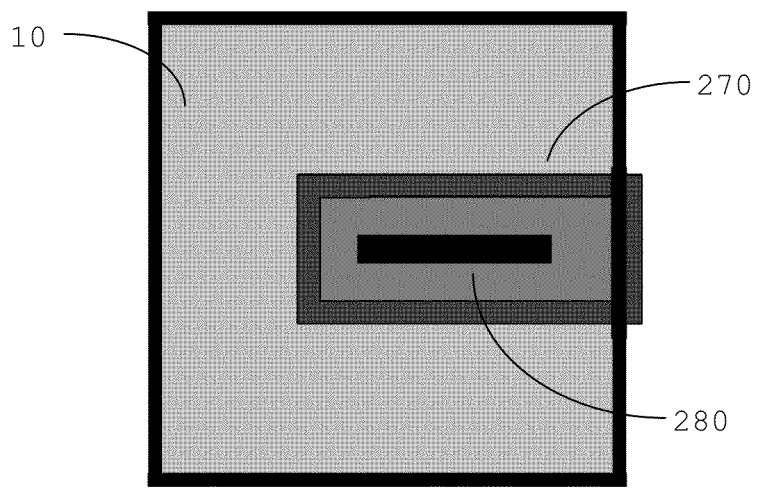
FIG. 8 shows a top view of an insulated capturing socket with embedded heat conductor.

For this purpose, the IRB features modular insulated capturing sockets (ICSs) underneath each Fresnel lens of the SCA, as shown in FIGS. 7 and 8.

Each of the insulated capturing sockets (ICSs) 270 contains a heat conductor 280 that captures the focused solar energy delivered by the Fresnel lens 10 placed above it.

The heat conductors have the shape of segmental arches on their upper sides, in order to maintain the lenses of the SCA continuously focused during sun tracking.

Each ICS features also a curved transparent plate 260 mounted above the heat conductor, which guarantees its thermal insulation on the upper side and simultaneously avoids dirt entrance. The transparent plates also have the shape of segmental arches like the heat conductors, in order to maintain equal light refraction at different vertical angles of the Fresnel lenses.

Figure 9:
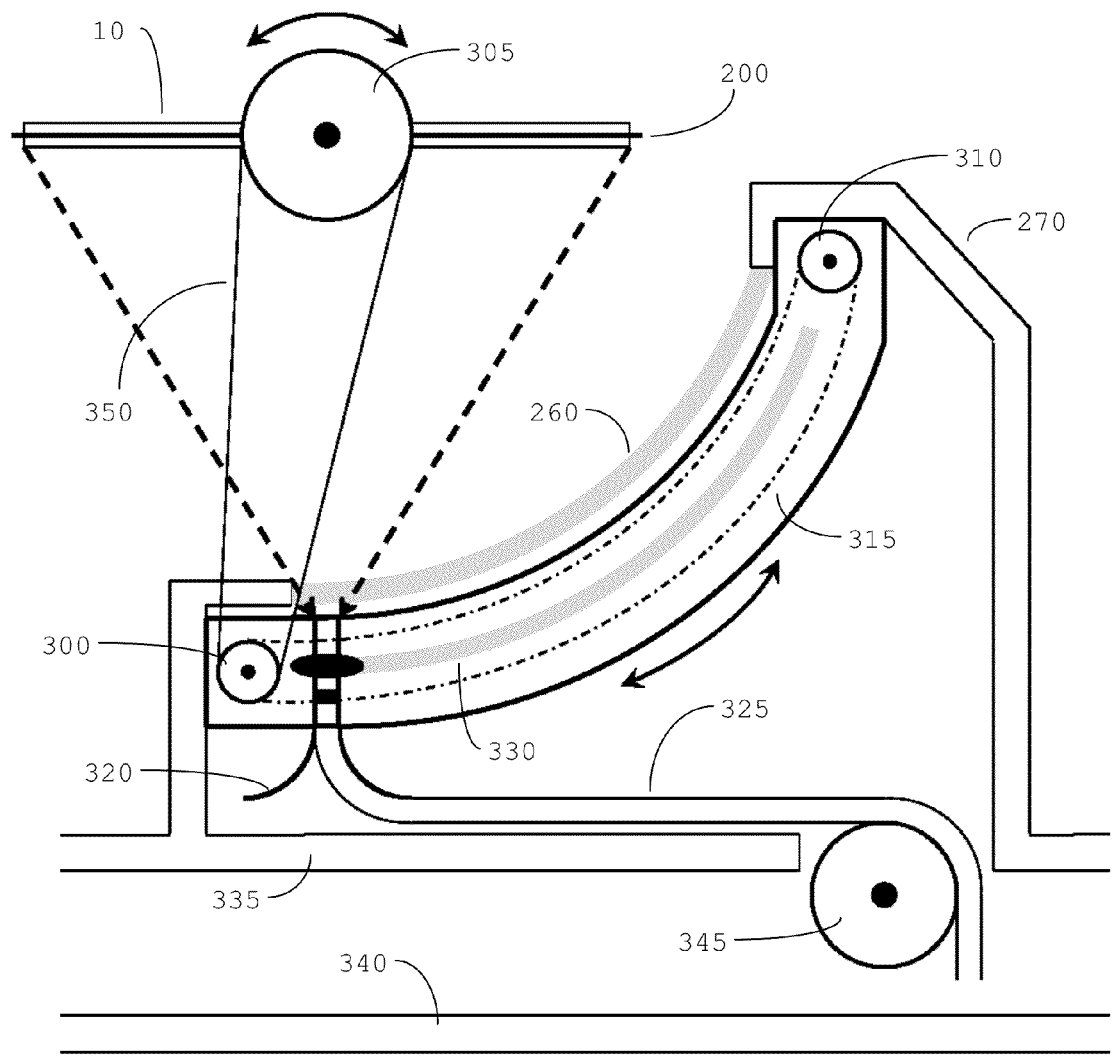
FIG. 9 shows an insulated capturing socket with a light guiding fiber in the lower position.
Figure 10:
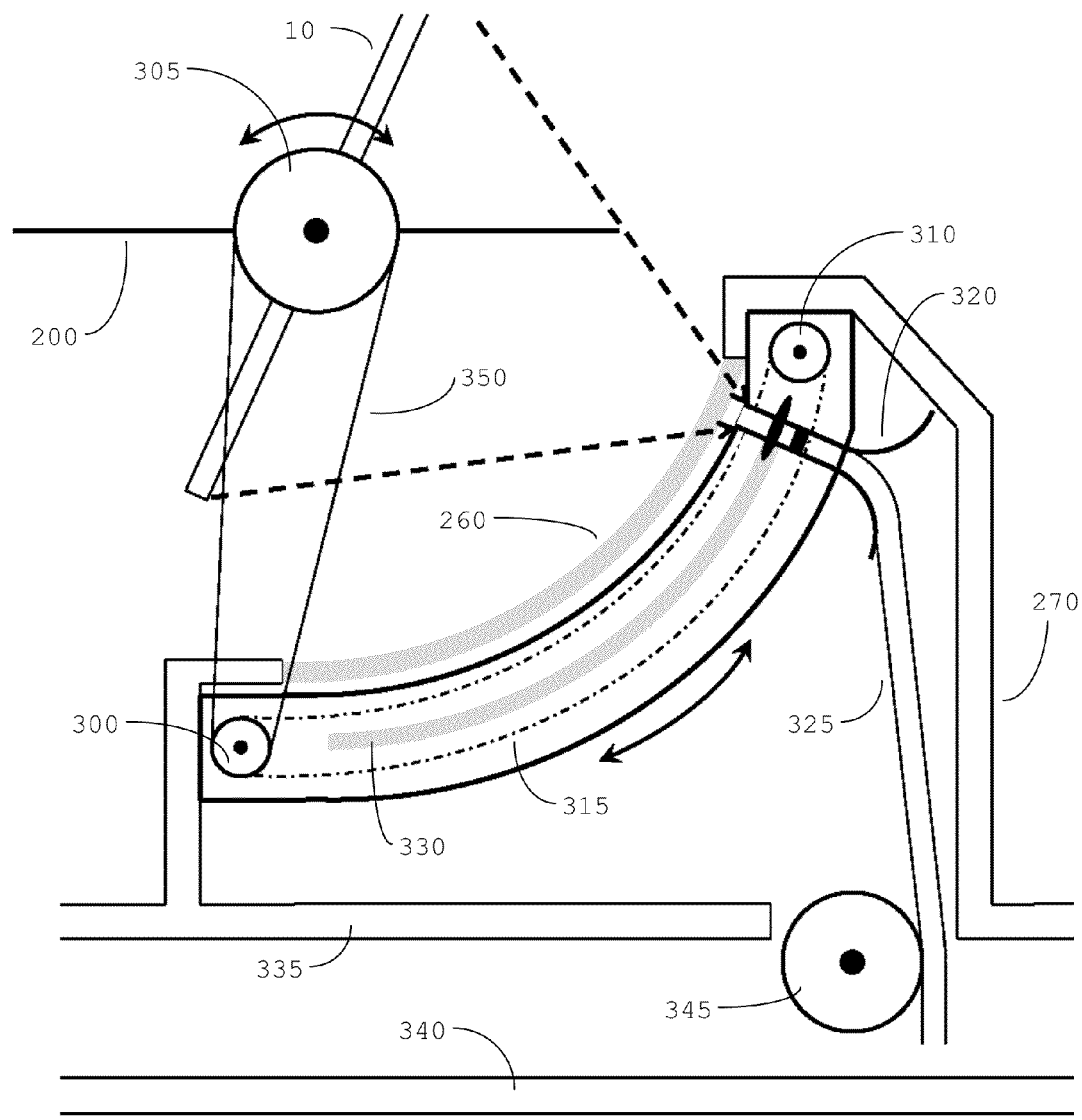
FIG. 10 shows an insulated capturing socket with a light guiding fiber in the upper position.
Figure 11:
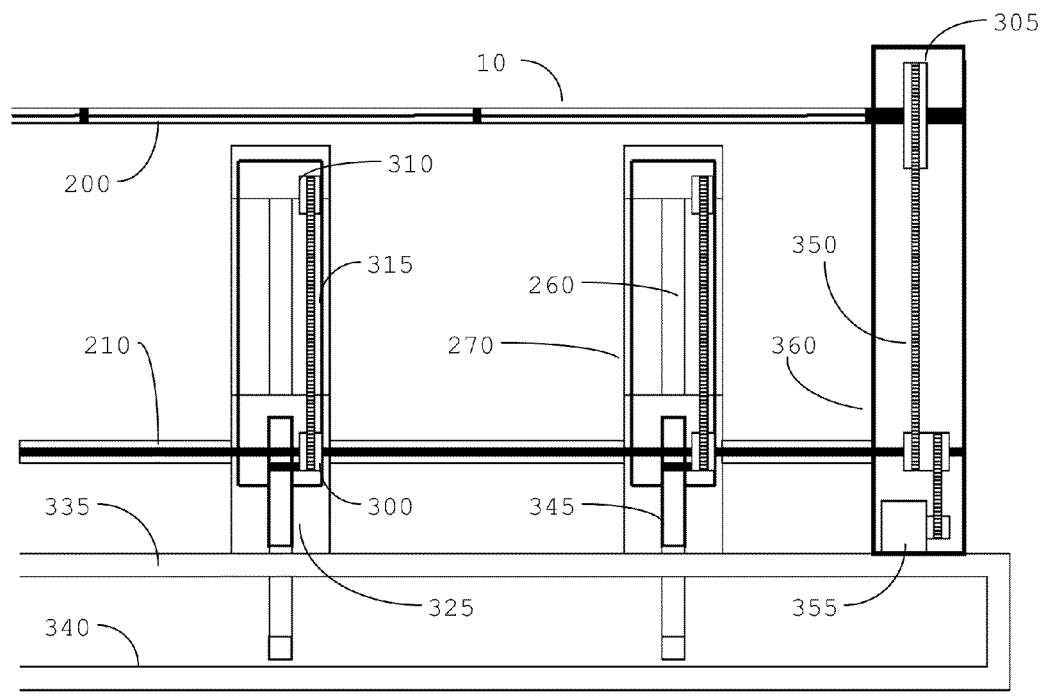
FIG. 11 shows a front view of two insulated capturing sockets with light guiding fibers.

Furthermore, each ICS Features an Automatic Wipe-Cleaning System for its Curved Transparent Plate b. Capturing of Focused Solar Energy by Means of Light Guiding Fibers For this purpose, special insulated capturing sockets (ICSs), as shown in FIGS. 9, 10 and 11, are employed.

The IRB features a thermally insulated bottom 340 and forms a sealed insulated box, which encloses all necessary parts of the system, in order to prevent energy losses, but also to protect from dirt.

Each ICS 270 is mounted on the top of the IRB 335 and encloses the fiber tracking box, one end of a light guiding fiber 325, a fiber guiding wheel 345 and a curved transparent plate 260 for thermal insulation and dirt protection.

The horizontal tracking is performed by the rotating movement of the IRB.

The drive for the vertical tracking is enclosed in the vertical tracking drive box 360. There, the motor 355 drives the transmission chains 350 in order to perform a simultaneous tracking for the Fresnel lenses 10 and for the light guiding fibers 325.

The fiber tracking box encloses the vertical tracking gearwheel 300, the fiber tracking gearwheel 310, the guide chain 315 and the fiber guiding socket 320. The fiber guiding socket 320 surrounds the light guiding fiber 325 and performs a circular motion, which enables the tracking of the focus. For this purpose, the fiber tracking box features slide grooves 330 as guides for the circular motion of the fiber guiding socket 320. The fiber guiding socket 320 features appropriate slide wings that slide along the slide grooves 330. The fiber guiding socket 320 has at its lower end the shape of a horn, in order to enable a smooth guidance of the light guiding fiber 325 and prevent its sharp edging or folding. The drive for the circular motion of the fiber guiding socket 320 is performed by a guide chain 315.

In order to remain on track, the diameter of the vertical tracking gearwheels 300 must have the correct ratio to the diameter of the gearwheel 305 for the row of lenses. According to this ratio, the fiber guiding socket 320 moves with the correct angular velocity, in order to follow the rotation of the Fresnel lens 10 above it.

A major advantage of the ICSs is their good insulation from the environment. Each ICS operates as a sealed box, avoiding thermal losses and dirt entrance. There is no contact between the Fresnel lenses 10 and the light guiding fibers 325. The drive for the tracking of all foci of an entire row of Fresnel lenses is performed by means of a single vertical tracking axis 210 only.

Each light guiding fiber 325 is passed between the top and the bottom of the IRB over a fiber guiding wheel 345, which prevents sharp edging or folding. Furthermore, each ICS 270 features an automatic wipe-cleaning system for its curved transparent plate 260.

Thermal Storage System

The IRB is capable of transferring all energy delivered by the SCA to a thermal storage system. Such a system allows operation of a solar thermal plant also in bad weather or at night. One of the most established methods for retaining collected thermal energy is the storage in molten salt. Alternatively, a solid medium, e.g. graphite, can be used. Both materials can be kept in storage tanks, which are so well insulated that the thermal energy can be usefully stored for up to two months.

The system presented here can preferably use molten salt or graphite to transfer heat and supply a heat engine, while simultaneously benefitting from an embedded thermal storage system. The main idea is not to heat a thermodynamic engine directly, but to first heat a storage medium, which supplies the heat engines with energy. The storage medium can be heated by conduction or by means of light guiding fibers.

i. Heating Molten Salt by Conduction

In order to minimize moving parts for the energy transfer, we place a main thermal storage tank directly underneath the insulated rotatable base (IRB). In order to prevent energy loss, the IRB must have very good thermal insulation. The main storage tank can also be placed into the ground.

Figure 12:
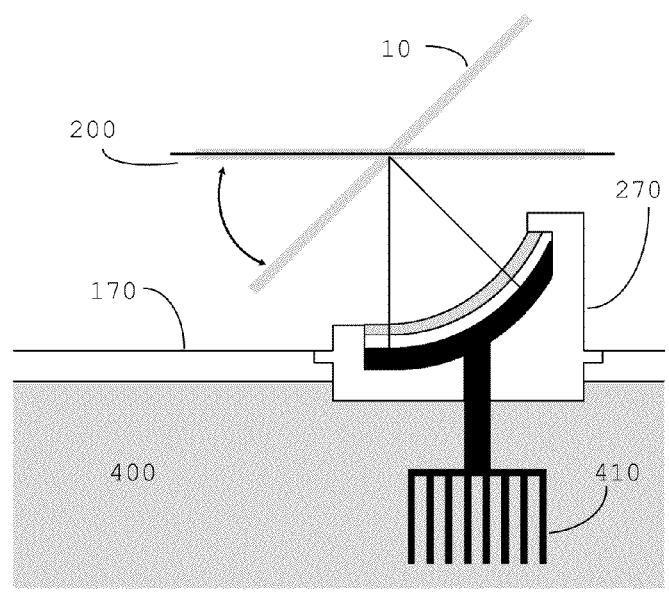
FIG. 12 shows the conductor gills for conductive heating of the molten salt.

The IRB here forms a sealed (but rotating) cover of the thermal storage tank. Each lower end of an ICS-heat conductor features gills 410, which are immersed into the salt 400, as shown in FIG. 12.

ii. Heating Molten Salt or Graphite by Means of Light Guiding Fibers

In this case, the IRB features a thermally insulated bottom (shown in FIGS. 9 to 11) and does not form the cover of the storage tank, which is separately sealed. The light guiding fibers can guide the energy to several storage tanks.

Figure 13:
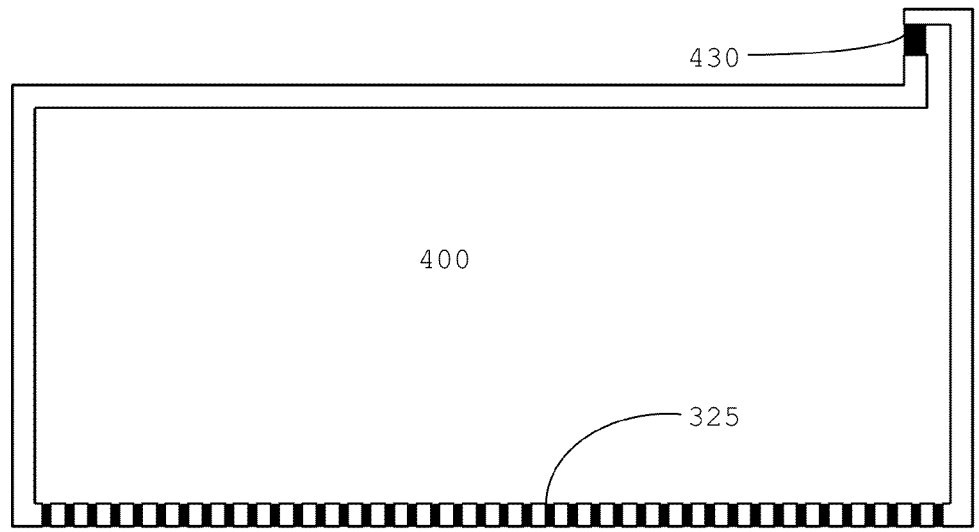
FIG. 13 shows a side view of a storage tank.

A storage tank can feature short light guiding fibers embedded in its bottom, and thus can guide heat to the storage medium from below, as shown in FIG. 13. The embedded light guiding fibers are coupled to longer ones that lead the solar energy from the IRB and forward the energy into the storage tank.

Considering molten salt as storage medium, the storage tank design takes advantage of convection principles and thus allows the heating of molten salt, and also the operation of heat engines, without the use of a pump. The design is shown in FIG. 13. We lead the solar energy underneath the storage tank by means of light guiding fibers 325 and heat the molten salt 400 from these lowest points, causing movement of the fluid due to convection. The heated molten salt flows to the top of the storage tank, leaving molten salt with a lower temperature at the bottom. The colder molten salt is thus heated by the light guiding fibers. The movement continues until the lower, colder side reaches similar temperatures to those of the upper, hotter side.

Stirling engines 450 can be mounted 430 on top of the storage tank. They absorb great amounts of heat for their operation, causing a substantial cooling of the molten salt. Hence, we obtain colder molten salt above the bulk of the storage tank, which results in a further movement of the hotter fluid towards the Stirling engines. The cooled molten salt flows to the bottom of the storage tank.

Considering graphite as storage medium, the storage tank design takes advantage of conduction principles and thus allows the heating of graphite, and also the operation of heat engines, without the use of mechanical parts.

Stirling engines 450 can also be mounted 430 on top of the storage tank. They absorb great amounts of heat for their operation, causing a substantial cooling of the upper graphite side, hence causing a heat transfer from the hotter lower side to the colder upper side.

Transferring Solar Energy Without an Electricity Network

In most cases, thermal energy can be usefully stored in insulated tanks for up to two months. Therefore, the apparatus presented in this invention also features a mounting system which enables the connecting and disconnecting of the above presented storage tanks. Hence, it also enables the transfer of entire storage tanks to a desired location, where they can be used for electricity production, e.g. by means of Stirling engines, turbines or the like. The electricity production thus need not occur in the same location as the solar energy collection.

Figure 14:
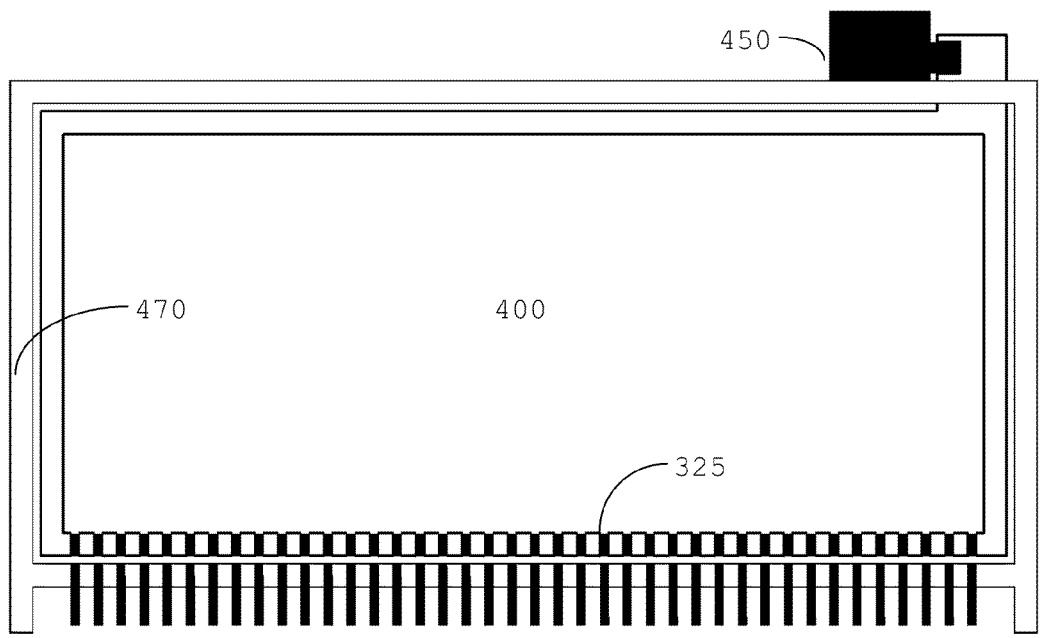
FIG. 14 shows a side view of the layout of a transportable storage tank.

Consider FIG. 14: The connecting and disconnecting part of the system consists of a structure 470, under which one or more storage tanks can be placed in order to be connected to Stirling engines 450 and to light guiding fibers. The structure features a ceiling, on which Stirling engines 450 are mounted. The light guiding fibers lead to the bottom of the structure 470, as shown in FIG. 14. There, they are coupled to short light guiding fibers 325 embedded into the bottom of the storage tanks (see FIG. 14) to guide the solar energy into the storage tank. One side of the structure features an opening mechanism to allow the entrance or exit of one or more storage tanks.

Graphite blocks, but also established molten salts such as FLiNaK or FLiBe might require very large solar capturing arrays, in order to cope with their high heat storage capacities.

Figure 15:
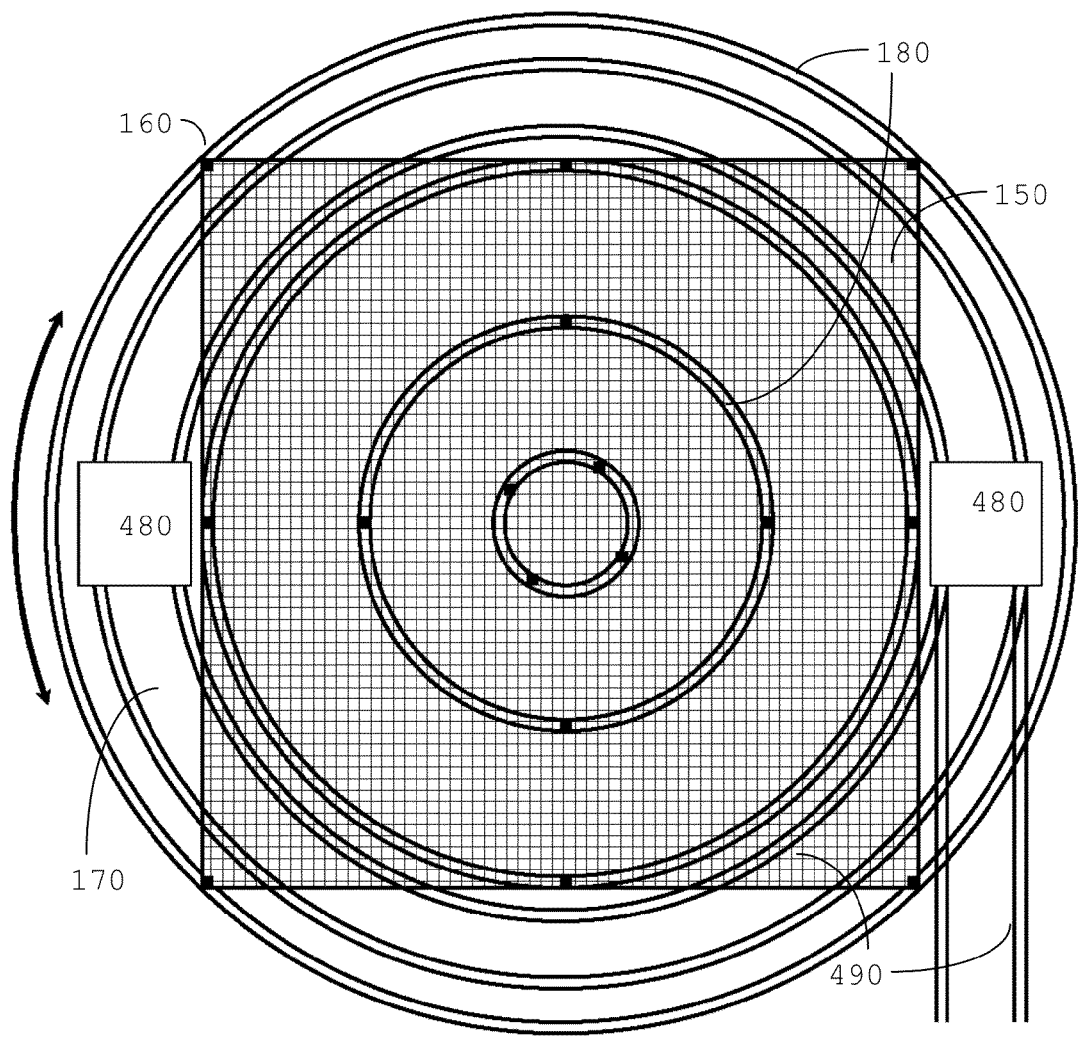
FIG. 15 shows a top view of a large IRB with two embedded transportable storage tanks.

In such a case, it is preferred to consider embedding one or more transportable storage tanks 480 in a large IRB 170, as shown in FIG. 15. For this purpose, the IRB is placed on multiple circular rails 180 and features several arms 160 in order to achieve a better static behavior. The energy is transferred directly underneath the storage tanks 480 by means of light guiding fibers. The storage tanks 480 follow the rotation of the IRB 170. For this purpose they move on their own circular rails 490. The design allows mounting and unmounting of transportable storage tanks.

Extending Annual Operation of Solar Thermal Power Plants

This chapter refers to solar power plants with non-transportable heat storage tanks, thus having limited storage capabilities.

a. Very Low Material Expenses

A solar energy system without any storage tanks is only able to operate if it receives enough solar irradiation. For such a system, we have Annual Operation Hours≤Annual Sunshine Hours For longer operating hours, we must therefore equip the system with energy capturing capabilities that exceed its maximum energy consumption, and capabilities for storing superfluous captured energy.

Thus, operating a system with storage tanks requires a significant increase of the solar energy capturing surface. On the other hand, this increase strongly depends on the annual solar irradiation hours at the location of the system.

Compared to a System Without Storage Capabilities, the Additional Investment in a Solar Power Plant Featuring Thermal Storage Involves i. a significantly increased amount of solar energy capturing devices, in order to cover the required additional capturing surface;

ii. heat storage tanks with enough capacity for the superfluous captured energy; and iii. additional land.

The system presented in this invention merely requires additional Fresnel lenses and their frames, insulated capturing sockets (ICSs), and heat conductors or light guiding fibers, in order to increase its solar energy capturing surface. All of these parts consist of commonly used materials and can be purchased or manufactured at very low cost.

b. Smart Management of Storage Tanks

Investments in energy storage systems are basically focusing on two main targets:

In periods of good weather and daylight, store as much energy as possible, while simultaneously operating the system at maximum capacity.

In periods of bad weather or darkness, enable as much operation as possible.

However, if we consider power plants with non-transportable storage tanks, their capacity is limited and can usually handle a fixed amount of energy. Moreover, it is very difficult in practice to store heat during the summer months in order to use it in the winter. In most cases, thermal energy can only be usefully stored for up to two months. Thus, capacity problems would occur:

In long periods of good weather, a continued storage of captured energy would most likely exceed the capacity of the storage tanks.

In long periods of bad weather, the captured energy would not be sufficient, for example to keep molten salt liquid. This could destroy the plant.

Consequently, known applications only feature very limited heat storage capabilities that cover up to a few hours of extended operation.

In order to overcome these problems, the system presented in this invention features I. a set of simultaneously operating heat engines, II. a set of interconnected storage tanks, and III. embedded controllers that feature real-time algorithms, performing smart management of the system on-the-fly.

The invention consumes the total captured solar energy for electricity production and allows nearly non-stop operation of at least a subset of its heat engines.

Two practical limitations must be confronted:

a. The capacity of storage tanks is limited.

b. Thermal energy can only be stored for up to two months.

One or more embedded controllers featuring real-time algorithms supervise the system and all its parameters and perform on-the-fly smart management of the energy amounts. A main advantage of these real-time controllers is their ability to consider weather forecasts.

The controllers feature real-time formal methods, in order to obtain mathematical proof of the fulfillment of the requirements of the system. This is performed in 3 steps.

Figure 16:
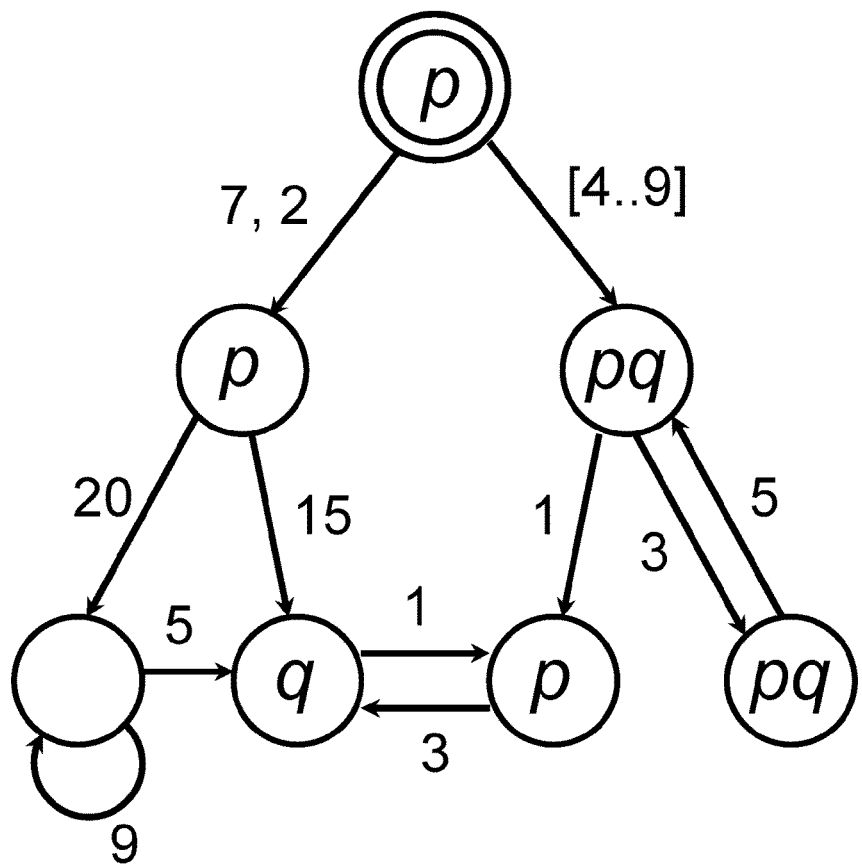
FIG. 16 shows a timed Kripke-structure.

In the first step, the controller models the entire solar thermal plant $P$ as a real-time system:

$$P := \{E, \tau, M, S, C, \theta, W\}$$

where $E$ is a set of heat engines $\tau$ is a set of interconnected storage tanks $M$ is a set of solar capturing matrices $S$ is the total capturing surface of the plant $C$ is the total storage capacity of the plant $\theta$ is the temperature of the storage medium $W$ is a set of evaluable weather forecast parameters In the second step, the controller transforms the model into a timed Kripke-structure (see Logothetis, G.: "Specification, Modeling, Verification and Runtime Analysis of Real Time Systems", chapter 3.1). An example of a timed Kripke-structure is shown in FIG. 16.

The main characteristics of a timed Kripke-structure are as follows:

It is a discrete time model.

It has a finite number of states.

Its paths are infinite and represent the system's behavior.

Each transition consumes one or more units of time.

The choice of transition is non-deterministic.

Formulae represent the system's properties at any given state.

Labeled edges represent timed actions.

Examples for formulae:

p:=temperature of 5th auxiliary storage tank is 532.5° C.

q:=27% brollability according to weather forecasts

Examples for transitions:

brollability will change from 23% to 31% within 55 hours, according to weather forecasts 2nd auxiliary storage tank will reach its maximum heat capacity after 17 hours Timed Kripke structures representing real-time systems often have more than $10^{200}$ states.

Figure 17:
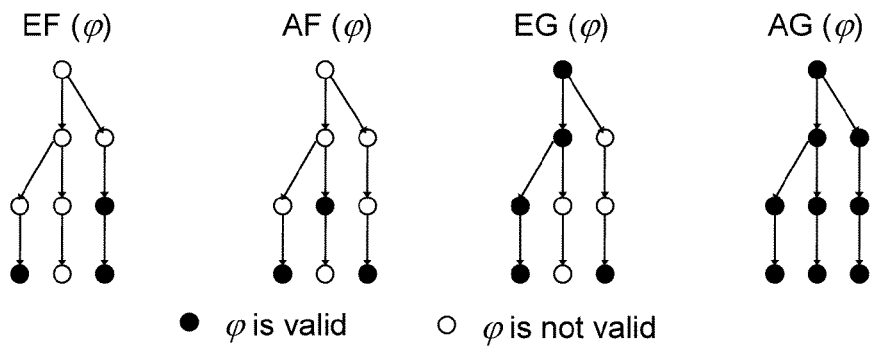
FIG. 17 shows basic JCTL operators.

In the third step, the controller applies JCTL algorithms. JCTL (see Logothetis, G.: "Specification, Modeling, Verification and Runtime Analysis of Real Time Systems", chapter 3.2) is a branching-time temporal logic which considers real-time systems modeled as timed Kripke-structures (see FIG. 17). JCTL has the following properties:

- JCTL uses modal operators, path quantors and time-constraints.
- JCTL formulae exactly describe the specifications of a system.
- JCTL algorithms explore the entire state space to verify JCTL formulae.

Thus, we proceed as follows:

- The controller uses JCTL formulae to describe the required specifications of a system in order to ensure non-stop operation.
- Then, JCTL algorithms are applied, in order to explore the entire state space to obtain mathematical proof for the existence of paths that satisfy the required specifications.
- Once found, the controller traces at least one of these paths.
- The system follows the actions of the traced path.
- If no such path exists, the controller automatically considers the next less tight constraint and starts examining it, and so on.

Example: Verify the existence of paths, such that the temperature of the 2nd, 5th and 7th storage tanks will stay above 617.3° C. for at least 48 hours.

Implementing Power Plants

This chapter refers to solar power plants with non-transportable heat storage tanks, thus having limited storage capabilities.

a. Definitions

The consuming surface $S_{cons}$ is the minimum solar capturing surface required by one heat engine of the plant in order to operate at maximum power.

Focusing on non-stop operation, we consider the required increase of the capturing surface. This increase strongly depends on the annual hours of solar irradiation at the location of the plant.

The storing surface $S_{stor}$ is the minimum solar capturing surface required for collecting within a period of one year an amount of energy that would enable the true non-stop operation of one heat engine for one year at its specific location.

The increase factor $\phi_{inc}$ is the ratio $S_{stor}/S_{cons}$, indicating the surface increase required for true non-stop operation according to the solar irradiation at the location of the plant.

For example, in a location with an average of 2,200 hours of solar irradiation, non-stop operation would require increasing $S_{cons}$ by a factor of $\phi_{inc} \cong 4$ (8,760/2,200), i.e. $S_{stor} \cong 4 \cdot S_{cons}$.

The surface multiplier $\lambda \in \{x \in \mathfrak{R} \; x \geq 1 \wedge (\lceil \phi inc \rceil \cdot x) \in \aleph \}$ determines optimized sizes of the capturing surface related to the number of heat engines.

The non-stop surface-requirement $S_{nst} := \lambda \cdot S_{stor} \cdot (\lceil \phi \rceil / \phi_{inc})$ is the minimum capturing surface required in order to achieve true non-stop operation of at least $\lambda$ heat engines.

The non-stop engine requirement $\epsilon_{nst} := \lambda \cdot \lceil \phi_{inc} \rceil$ is the minimum number of heat engines required in order to achieve nearly non-stop operation of at least $\lambda$ of them.

b. Example

We consider a system, comprising

- a set of $\epsilon_{nst}$ heat engines,
- a set of $\epsilon_{nst}/\lambda$ solar capturing arrays (SCAs), each with a surface of $(\lambda \cdot S_{nst})/\epsilon_{nst}$,
- a set of $\epsilon_{nst}/\lambda$ IRBs, each carrying $\lambda$ heat engines
- a main storage tank (heat engines mounted above it are main engines),
- a set of auxiliary storage tanks (heat engines mounted above them are auxiliary engines), and
- one or more embedded real-time controllers.

Figure 18:
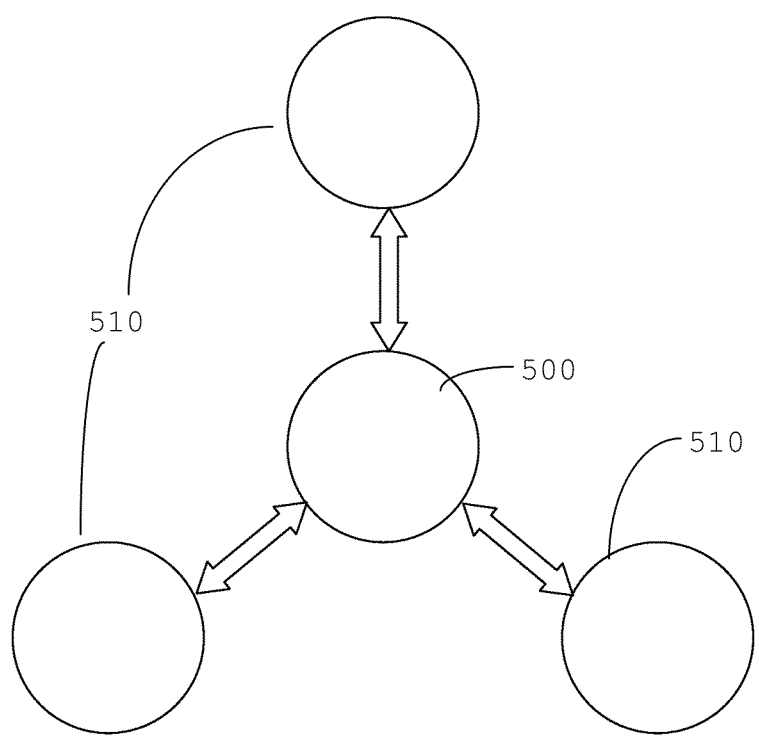
FIG. 18 shows a star topology interconnection of storage tanks.

FIG. 18 shows a very simplified implementation of the above, where $\lambda=1$ and $\epsilon_{nst}=4$: One main and three auxiliary storage tanks are used.

1. The main storage tank 500 is kept as small as possible in order to maintain the optimal operating temperature, but also to achieve quick heating of the tank contents after a long period of bad weather. The auxiliary storage tanks 510 are all directly connected to the main tank in a star topology.
2. Each heat engine is supplied with energy from the storage tank underneath the IRB it is mounted above.
3. All solar capturing arrays (SCAs) send their energy directly to the main storage tank.
4. A total surface of $S_{nst}$ supplies the main storage tank with energy. This capturing surface would allow a true non-stop operation of $\lambda$ heat engines.
5. In long periods of good weather, the main heat engines cannot convert all the captured heat into electricity. When the capacity of the main storage tank is exceeded, the controllers decide as follows:
   a. If the temperature of at least one auxiliary tank is suitable for the operation of its heat engines, then, depending on the weather forecast,
      i. allow operation of some auxiliary heat engines; or
      ii. allow heat exchange from the main storage tank to some auxiliary tanks, in order to store the entire energy; or
      iii. allow both of the above;
   b. else (none of the auxiliary tanks has sufficient temperature for operation of its heat engines), depending on the weather forecast,
      i. allow heat exchange from the main storage tank to one auxiliary tank only, in order to increase its temperature; or
      ii. allow heat exchange from the main storage tank to more than one auxiliary tank.
6. If the capacity of one or more auxiliary tanks is also reached, the controllers decide according to the weather forecast in an analogous way, as for the main storage tank.
7. If the capacity of all storage tanks is reached, the controllers allow the operation of all heat engines. Thus, loss of captured solar energy is avoided. In particular, if $S_{plant}$ is the total capturing surface of the entire plant, we have $$S_{plant} = ((\lambda \cdot S_{nst})/\epsilon_{nst}) \cdot (\epsilon_{nst}/\lambda) = S_{nst}$$

$$\Leftrightarrow S_{plant} = \lambda \cdot S_{stor} \cdot (\lceil \phi_{inc} \rceil / \phi_{inc})$$

$$\Leftrightarrow S_{plant} = \lambda \cdot \phi_{inc} \cdot S_{cons} \cdot (\lceil \phi_{inc} \rceil / \phi_{inc})$$

$$\Leftrightarrow S_{plant} = \lambda \cdot \lceil \phi_{inc} \rceil \cdot S_{cons}$$

$$\Leftrightarrow S_{plant} = \epsilon_{nst} \cdot S_{cons}$$

The total captured energy of the plant does not exceed the maximum energy consumption of all heat engines. Thus, if all engines are running, all captured energy is consumed for electricity production.

8. In long periods of bad weather, the controller first decides the number of heat engines that are allowed to operate. For this purpose, the consideration of weather forecasts is essential:
   a. Operating too many heat engines will consume the stored energy too quickly. This might lead to low salt temperatures if the bad weather continues.
   b. Operating a lower number of engines might lead to insufficient electricity production, if the duration of the bad weather is foreseeable.
9. As the temperature of the storage tanks decreases, the controller decides on the basis of weather forecasts,
   a. to stop the operation of some heat engines; or
   b. to interrupt the heat exchange between the main tank and some of the auxiliary tanks; or
   c. to perform both of the above.
10. Interruption of the heat exchange between an auxiliary tank and the main tank takes place at a storage medium temperature $T_{int}$. In case of molten salt, $T_{int}$ must be higher than the melting point of the salt used. In case of graphite, $T_{int}$ must be high enough to ensure the further operation of the power plant. The controller selects the optimal $T_{int}$ based on weather forecasts.
11. In a worst-case scenario the system allows the use of external energy sources in order to always keep the temperature of a chosen salt above melting point.

While the present inventions have been described and illustrated in conjunction with a number of specific embodiments, those skilled in the art will appreciate that variations and modifications may be made without departing from the principles of the inventions as herein illustrated, as described and claimed. The present inventions may be embodied in other specific forms without departing from their spirit or essential characteristics. The described embodiments are considered in all respects to be illustrative and not restrictive. The scope of the inventions is, therefore, indicated by the appended claims, rather than by the foregoing description. All changes which come within the meaning and range of equivalence of the claims are to be embraced within their scope.

REFERENCES

20 Fresnel lens
20 conventional optical lens
50 industrial application of prior art system
100 single large Fresnel lens
110 array of Fresnel lenses
150 solar capturing array (SCA)
160 arm
170 insulated rotatable base (IRB)
180 circular rails
200 frame
210 vertical tracking axis
250 vertical tracking
260 curved transparent plate
270 insulated capturing socket (ICS)
280 heat conductor
300 vertical tracking gearwheel
305 lens row gearwheel
310 fiber tracking gearwheel
315 guide chain
320 fiber guiding socket
325 light guiding fiber
330 slide grooves
335 top of IRB
340 bottom of IRB
345 fiber guiding wheel
350 transmission chain
355 vertical tracking motor
360 vertical tracking drive box
400 thermal storage medium, e.g. molten salt
410 heat conductor gills
430 mounting for Stirling engine
450 Stirling engine
470 structure for connecting to portable storage tank
480 portable storage tank
490 rails supporting storage tank
500 main storage tank
510 auxiliary storage tank

REFERENCE CITED

Patent Literature
U.S. Pat. No. 4,335,578
U.S. Pat. No. 6,775,982 B1
US 2006/0225729 A1
WO 81/03220
Non-Patent Literature
Logothetis, G.: "Specification, Modeling, Verification and Runtime Analysis of Real Time Systems". Vol. 280 of Dissertations in Artificial Intelligence, IOS Press 2004, ISBN 978-1-58603-413-9

The invention claimed is:

1. A solar collector apparatus comprising:
   a) an array of Fresnel lenses arranged in rows, the Fresnel lenses having a focal length;
   b) one or more energy absorption devices located below each of the Fresnel lenses at a distance corresponding to their focal length; wherein each energy absorption device comprises:
      a light guiding fiber having an end;
      an adjusting component capable of adjusting the position of the end of the light guiding fiber; and
      a casing surrounding the light guiding fiber and the adjusting component;
      wherein the upper side of said casing is formed by a transparent plate having the shape of the segment of a circle having a center located above the transparent plate;
      wherein the light guiding fiber extends to a heat conduction and storage medium through an opening of said casing,
   c) the rows the array of Fresnel lenses rotatable about a lengthwise horizontal axis of said rows; wherein
   d) the array of Fresnel lenses rotatable about a vertical axis; and
   e) a rotation component capable of rotating the rows of the array of Fresnel lenses about the lengthwise horizontal axis of the rows, wherein said rotation component is linked to the adjusting component.

2. The solar collector apparatus of claim 1, wherein the Fresnel lenses are square shaped.

3. The solar collector apparatus of claim 1, wherein the array of Fresnel lenses is mounted on a base rotatable about a vertical axis; and wherein the rotatable base forms an insulated lid of a storage tank for a heat conduction and storage fluid.

4. The solar collector apparatus of claim 1, wherein each energy absorption device comprises:
   a) a heat conductor;
   b) a transparent plate mounted about the heat conductor; and
   c) an insulated casing surrounding the heat conductor where it is not covered by the transparent plate;

d) wherein both the heat conductor and the transparent plate have the shape of a segment of a circle having a center located above the transparent plate.

5. The solar collector apparatus of claim 4,
a) wherein the heat conductor extends into a heat conduction and storage fluid through an opening in the insulated casing; and
b) wherein a part of the heat conductor submerged in the heat conduction and storage fluid is gill-shaped.

6. The solar collector apparatus of claim 1, wherein each energy absorption device additionally comprises an automatic wipe-cleaning system for the transparent plate.

7. A system for solar energy collection and electricity production, comprising
a) the solar collector apparatus of claim 1;
b) a thermal storage system having a thermal energy conduction and storage medium;
c) at least one transformation component capable of transforming thermal energy into electrical energy;
d) a first connection component capable of connecting the solar collector apparatus with the thermal storage system;
e) a second connection component capable of connecting the thermal storage system with the at least one transformation component; and
f) wherein the thermal energy conduction and storage medium supplies the at least one transformation component with thermal energy via the second connection component.

8. The system for solar energy collection and electricity production of claim 7, wherein the transformation component comprises a heat engine employing a thermodynamic cycle,
wherein the heat engine is coupled to an energy generating component capable of generating electrical energy from mechanical energy.

9. The system for solar energy collection and electricity production of claim 8, wherein the heat engine is a Stirling engine.

10. The system for solar energy collection and electricity production of claim 7, wherein the thermal storage system has at least one insulated storage tank containing the heat conduction and storage medium, and wherein this medium is solid.

11. The system for solar energy collection and electricity production of claim 10, wherein the heat conduction and storage solid is graphite.

12. The system for solar energy collection and electricity production of claim 10,
further comprising an exchanging component capable of exchanging the at least one insulated storage tank;
wherein the insulated storage tank is configured to be transportable.

13. The system for energy collection and electricity production of claim 7,
wherein thermal storage system has at least one insulated storage tank containing the heat conduction and storage medium; and
wherein this medium is a fluid.

14. The system for solar energy collection of claim 13, wherein the heat conduction and storage fluid is molten salt.

15. The system for solar energy collection and electricity production of claim 13, comprising an exchanging component capable of exchanging the at least one insulated storage tank;
wherein the insulated storage tank is configured to be transportable.

16. The system for solar energy collection and electricity production of claim 7,
wherein the thermal storage system has at least one insulated storage tank containing the heat conduction and storage medium, and
wherein the first connection component is configured such that the at least one insulated storage tank is heated from below.

17. The system for solar energy collection and electricity production of claim 7,
wherein the thermal storage system has at least one insulated storage tank containing the heat conduction and storage medium,
wherein the transformation component comprises a heat engine employing a thermodynamic cycle, and
wherein the second connection component is configured such that heat is transferred from the top of the at least one insulated storage tank to the least one heat engine.

18. The system for solar energy collection and electricity production of claim 7,
additionally comprising embedded controllers using real-time algorithm;
wherein said algorithms are able to consider weather forecast data.

* * * * *